Feb. 21, 1939.  J. P. BURKE  2,148,011
CAMERA AND METHOD OF PHOTOGRAPHY
Original Filed Feb. 2, 1935
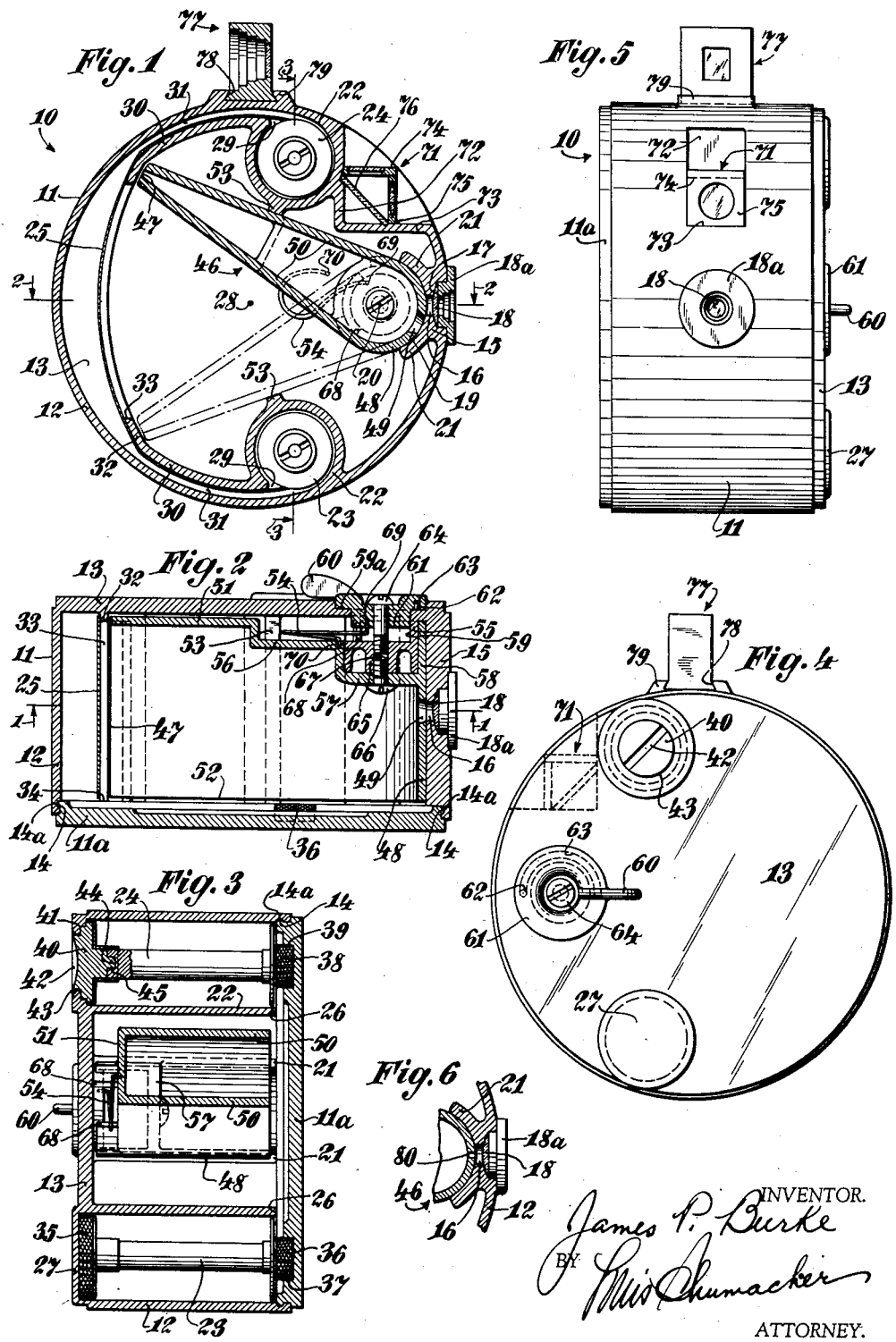
INVENTOR.
James P. Burke
BY
ATTORNEY.

Patented Feb. 21, 1939

2,148,011

UNITED STATES PATENT OFFICE 2,148,011

CAMERA AND METHOD OF PHOTOGRAPHY

James P. Burke, Knoxville, Tenn.

Substituted for abandoned application Serial No. 4,627, February 2, 1935. This application February 11, 1938, Serial No. 190,114

12 Claims. (Cl. 95—58)

This invention relates to cameras and photography methods.

One object of the invention is to provide improved means for transmitting light to a film so that different parts of an object shall be successively photographed, but with the exclusion of any stray light which may affect the film.

Another object of the invention is the provision of improved shutter means for the continuous successive photographing of different parts of an object, the shutter means being particularly simple in construction and in its mounting, and being desirably oscillatable about an axis or small bearing, and so as to be very rapid in operation.

Another object of the invention is to furnish a shutter which can be made as a one piece structure, for example, as a molding, and yet fulfill the advantages desired.

Another object of the invention is to furnish an improved and particularly inexpensive mounting for an oscillatable shutter.

Another object is the provision of a camera having improved means for controlling the light directing means to assure projection of light as required by the shutter and in continuous alined register therewith.

Another object of the invention is to construct a camera having improved means coordinated with the shutter for actuating the same.

Another object of the invention is to furnish improved means for mounting and controlling the film carrying reels, and/or guiding the film.

Another object of the invention is the provision of a camera casing including a main casing section of one piece construction and adapted to be molded or cast and having various adjuncts integral therewith so as to require a minimum of separated parts.

Another object of the invention is to provide a camera structure having an improved arrangement of parts to facilitate assembling thereof.

Another object of the invention is to provide a camera having few and simple parts, and which is cheap to assemble, inexpensive to manufacture, which can be rapidly loaded for use, which is inexpensive to repair and can be readily examined for trouble, and which can be made substantially entirely as a molded proposition, which is neat, light in weight, compact, durable, reliable and highly efficient in use.

Another object of the invention is to provide an improved method of photography which shall afford a higher degree of precision and clearness than heretofore available with methods of the same general type.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a cross sectional horizontal view taken on the line 1—1 of Fig. 2.

Fig. 2 is a vertical sectional view taken on the line 2—2 of Fig. 1, but with the shutter in central alinement with the light inlet.

Fig. 3 is a vertical sectional view taken on the line 3—3 of Fig. 1.

Fig. 4 is a horizontal top plan view.

Fig. 5 is a view in side elevation of the device.

Fig. 6 is a fragmentary sectional detail view of a modified form of the invention.

This application is a substitute for application, Serial No. 4,627, filed February 2, 1935, for Cameras and methods of photography.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Referring in detail to the drawing, 10 denotes a device embodying the invention. The same may include a casing comprising a main box like casing section 11 and a cover 11a therefor. These parts can consist of metal or composition material, such as "Bakelite" and may be made as moldings, castings or stampings. If made as a molding, for instance, each part can be of one piece construction so arranged as hereinafter described, that it can be readily and inexpensively molded. If made as a stamping, each section can consist of parts suitably soldered, welded or otherwise secured together in a permanent one piece structure. However, the advantages of the invention in respect to the casing are best perceived from the standpoint of a one piece molded or cast structure.

The main casing section 11 may be of generally cylindrical or other suitable shape, and can include a cylindrical side wall 12 closed ended as by an end wall or disc 13, and being desirably fully open at its opposite end to be closed by the cover 11a. Any feasible means may be used for attaching the cover, for instance, the latter may have a marginal circular bead 14 releasably snapped into a corresponding internal groove 14a in the wall 12 near the opening thereof.

One portion of the side wall 12 may have an internal transversely extending enlargement or ridge 15 adapted for cooperation with a suitable transmitting means for transmitting or projecting radiant energy into the camera. For example, the ridge 15 may have a light receiving opening 16 which is generally radial to the casing section 11 and intermediate the ends thereof so as to be central to an exposed film section in the camera. The portion 15 may also have an externally open recess 17 whose inner surface may be concaved, for instance, to afford a concave seat for a lens 18. The latter may directly rest against the recessed seat, the arrangement being such that the lens can be directly externally inserted, and is coaxial with the opening 16, but of larger diameter than the latter. To releasably secure the lens 18 in operative position, a bushing or tube 18a can be removably press fitted or threaded into the recess or can be resilient and expansible so as to frictionally engage the circular or cylindrical wall of the recess. Thus the need for special attachments for mounting the lens is largely eliminated.

The inner face of the transverse enlargement portion 15 may be arcuate in form to afford a seat 19 which may be in the nature of a segment of a cylindrical surface having its axis at 20 parallel to the axis of the cylindrical casing section and desirably lying in a radial plane which includes the centers of the opening 16 and lens 18. If it be desired to produce a seat 19 of enlarged area, the portion 15 may have oppositely projecting longitudinal wings or lips 21 along which the seat 19 extends according to its proper curvature, this arrangement keeping down the weight of the camera and the quantity of material required for making the same. The function of the seat 19 will be hereinafter more particularly described.

The casing 11 may have a plurality of internal tubular portions 22 adapted to operatively receive the reels or rollers 23, 24 for the film 25. The tubular portions 22 may be duplicates of each other both in construction and arrangement. Each extends from the end wall 13 into proximity to the open end of the camera, and the inner wall portion of each terminates at 26 inside of the plane of the casing opening to afford a clearance for the cover 11a, as shown in Fig. 3, and with the cover substantially closing the open end of each tubular portion or roller guide 22. If desired, the closed ended portion 27 for each roller guide may be slightly outwardly offset as shown, at the wall 13. Each roller guide may be generally cylindrical internally and externally, and the axes thereof may be parallel to the axis of the casing 11 and lying in a plane at right angles to that of the axis 20 and axis 28 of the casing. Preferably the roller guides are offset at equal distances to one side of the axis 28 toward the seat 19 to afford requisite clearance in the casing 11, for a purpose hereinafter described.

Each roller guide 22 may be split or provided with a longitudinal slot 29 extending from the closed to the open end thereof for receiving the film 25. The slots 29 may be parallel to each other and are preferably in close proximity to the casing wall 12, and open in the same general direction. Inner wall portions or film guides 30 in the form of segments of cylindrical surfaces and paralleling the adjacent casing wall 12 in close proximity thereto, and being of approximately the same length as the roller guides 22, extend from the latter so as to afford arcuate film guide passages 31 in continuous uniform register with the slots 29. The film guides 30 may be of equal angular extent.

Interconnecting the film guiding portions 30, is a wall 32 subtended by an angle of approximately 60 degrees from the axis 20 in symmetrical equal relation to the plane of the axes 20, 28. The wall 32 thus consists of a segment of a cylindrical surface having a radius greater than that of the casing 11, and extends from the closed end or wall 13 thereof approximately to the plane determined by the ends 26 of the roller guides. The wall 32 is provided with a window or opening 33 for framing the section of film 25 on which a picture is being taken. Hence the window 33 may be of substantial or any suitable size, for instance, generally rectangular in shape, and adapted to sufficiently expose the film within the camera, and yet to permit the wall 32 to afford a continuous rim portion or window frame portion along the end wall 13 and at right angles thereto. Preferably, however, the window 33 may be fully open ended at the open end of the casing 11 at 34 to facilitate molding or casting of the casing without the use of cores.

The casing arrangements for manipulating the film rollers will now be described. The film comes wound on the roller 23 and is fed to and wound upon the roller 24 as consumed. These rollers may be of conventional type except for certain improvements therein. Thus the roller 23 may be adapted for releasable engagement in any suitable manner, as by a tongue and slot engagement, not shown, with a friction element or disc 35 adapted to act as a brake for slightly tensioning the film 25. The element 35 may be removably fitted in the proper roller guide as shown, at a closed end thereof, and its periphery may consist of felt or other suitable material for frictionally engaging the adjacent internal circular wall of the roller guide. If desired, the brake element may be permanently affixed to the end of the roller 23 or in such releasable manner as to be removable with the roller from the roller guide. The opposite end of the roller 23 may have an axially projecting head 36 releasably fitted in a recess 37 of the cover 11a. The head 36 may be resilient and may likewise afford a slight braking action for the roller to tension the film, but the braking effect of the head 36 may be such as to afford a desired relation in tension along the film for proper action, and may be less than that of the member 35 so that the tension on the film may be slightly less along the open end 34 of the window 33, than along the closed end thereof adjacent to the wall 13. This difference in braking effect may be obtained by using different frictional materials or a difference in diameter as between 35 and 36. The element 36 may be permanently fitted to the cover 11a so as to have frictional contact with the adjacent end of the roller.

The roller or spool 24 may likewise have at one end a frictional head 38 brakingly journaled in a recess 39 of the cover, and its opposite end may have permanent but preferably removable connection with a rotary actuator member 40. The latter may consist of a head journaled in a through hole or bearing 41 of the casing wall 13 and having an externally accessible slot 42 so that the head can be turned by a coin, or the like. The head can be secured in operative position in the casing as by being resiliently sprung into dovetailed or tongue and groove annular engagement with a rim portion of the opening 41 as at 43 in a manner generally similar to that shown for the cover 11a at 13, 14, and such engagement at 43 may also afford a braking action. The roller 24 may be removably engaged, if desired, with the head 40, in coaxial relation therewith, as by a conventional tongue and groove 44, 45 respectively so that rotation of the head 40 causes rotation of the roller 24. A construction similar to 44, 45 may be used between the brake head 35 and the adjacent end of the roller 23.

By the arrangement described, the rollers or spools 23, 24 are rotatably mounted with their axes parallel to each other, and so that rotation of the roller 24 pulls the film 25 and causes rotation of the roller 23, so that the film is drawn along the casing in suitably taut condition. In this manner different successive sections of the film are exposed or framed over the window 33 in proper opposed relation to the light opening 16.

Cooperating with the window 33 or the proper film section, as the case may be, is a light confining shutter means 46 for causing a beam of light to travel along the film. The shutter means 46 may include a slot 47 so that the principle is in this respect well known. This slot 47 is narrow and elongated and parallel to axes such as 20 or 28. Without being limited to the specific shape of the opening 47, I provide the shutter 46 as in the nature of an elongated light directing tube so that not only must the light pass through opening 47, but also any dispersion of light in the camera is prevented and hence clarity and sharpness of photography obtained in a high degree. The tube 46 may be angularly movable about axis 20, and is relatively flat. At its end opposite to the opening 47 it may be in communication or register with the light opening 16. Due to the proximity of this end to the light opening, said end may desirably be enlarged as shown at 48 to maintain a sufficient communication with the light opening 16 during movement of the shutter. Nevertheless, a principle may be utilized whereby the light opening 16 is controlled as by a shutter synchronously and consistently with the position of the opening 47. For example, the end portion 48 of the shutter tube may have a light inlet opening 49 movable across the opening 16 into and out of register therewith at opposite sides of the latter. The wall 48 may constitute a shutter portion, as by being journaled against the seat 19 in snug sliding contact therewith. Hence in either lateral position of the shutter, not only are the openings 16 and 49 out of register as shown, but the wall 48 prevents passage of light through the opening 16 for which it acts as a closure. In the positions mentioned, the opening 47 is directed against and closed by the rim or framing portion 32. Hence the film is doubly protected against stray light.

From the wall 48, which is in the form of a segment of a cylindrical surface, the side walls 50 of the shutter tube 46 may converge to form the slot opening 47. The walls 50 may extend along planes parallel to the axis 20 and from the closed wall 13 of the casing 11 to the open end of the latter. The side walls 50 may be interconnected by a reenforcing wall 51, but this can be omitted, if desired, and the tubular formation obtained by the walls 12 and 11a acting as closures for and between the walls 50 which are in suitable proximity thereto. Thus the shutter structure 46 may be wholly open along its opposite edge 52 and a suitable small clearance being afforded with the cover 11a, which acts as a light cover or closure for opening 52.

To limit the angular movement of the shutter 46, the roller receiving means 22 may have longitudinal ridges or stop portions 53.

Any suitable means may be provided for rapidly moving the shutter 46, and with such force as to overcome the friction and inertia of its mass. A usual spring 54 arranged for movement in opposite directions past a dead center position can be used. I provide a simplified construction associated with the spring and for movably mounting the shutter.

Thus the casing 11 may have an inward extending cylindrical hub 53 coaxial with 20. The shutter may be offset in stepped formation at 56, 57 to afford spaces for the spring 54 and the hub 55. Preferably the shutter may have a sleeve portion 58 journaled on the hub 55, the wall portion 57 affording a closed end for the sleeve 58. The hub 55 may be hollow at 59, and a finger piece 60 may have a trunnion 61 journaled in the recess 59 and directly on the wall 13 as in the nature of a thrust bearing at 59a. The latter may have a stop lug 62 projecting into an arcuate recess 63 of the portion 61 to limit the angular movement of the latter in different directions. A screw 64 passing freely axially through the member 61 may have threaded engagement with the end wall 65 of the hub 55 to operatively secure the actuator 60. A screw 66 coaxial with the axis 20 may pass freely through a hole in the wall portion 57 to have threaded engagement with the wall portion 65 for maintaining the shutter 46 in desired engagement on the hub 55. It is noted that a through hole 67 in the wall portion 65 having a single continuous thread may be used for the different alined screws 64, 66, and that the latter screw is accessible through the edge opening 52 of the shutter.

For mounting the spring 54, the hub 55 may have an arcuate opening 68 of sufficient angular extent about the axis 20 for ample movement of the spring. Said opening 68 desirably extends to the outside face of the casing, and is thus open, except as closed by the actuator 60. The spring 54 may have oppositely bent ends one of which is inserted into a hole in the actuator 60 to 69 and the other into a hole in the wall portion 56 of the shutter at 70. The main body of the spring 54 may be guidingly maintained in the suitable clearance space between the wall portion 56 and the casing wall 13.

A view finder 71 may be provided substantially as an integral part of the casing, although it can also be suitably removably connected thereto. It will be sufficient to indicate that the casing may be inwardly offset, as by providing wall portions 72, 73 as part of the side wall 12 of the casing, arranged to clear the path of the shutter 46. The walls 72, 73 may lie intermediate of circular casing wall 13 and a wall portion at the opposite end of the casing which completes the circular continuity for the cover arrangement means 14, 14a. One or both of the walls 74, 75 may be removably fitted in any suitable manner between the wall portions at the ends of the walls 72, 73, and the reflector 76 may also be removably fitted in place in a suitable manner. Both walls 74, 75 may be made as a unit and removably applied, but the view finder 71 can also be completely made up as a unit and attached to the outer periphery of the casing without using the recessing walls 72, 73. The walls 72, 73 may be molded by an insert plug.

A range finder 77 may be removably mounted as by having the base of the frame thereof provided with longitudinal means or lips 78 parallel to axis 28, the opposed lips 78 having dovetailed slidable engagement between lips 79 external of and integral with the lip 79. The space between the latter may be open at both ends to facilitate molding.

Except as otherwise described, the range finder 77 and the view finder 71 are intended to be conventional.

It will be seen that the camera comprises few parts. The casing 11 can be molded or cast as one piece with the use of few or no special cores. Thus the internal spaces all open at one end including the roller receiving guides 22, the film guides 31, the window 33, the seat 19 and the internal bearing space around the hub 55. The recess 59 in the hub opens toward the opposite end. Hence a simple mold and plunger can be used, and since the surface lines are all parallel, the plunger can be readily retracted and the casing easily removed from the mold. Likewise the shutter 46 can be made as a simple casting or molding being completely open at one side at 52, and the bearing 53 and offsets being open in the opposite direction, and the arrangement such that the plunger can be easily pulled out of the article without damage thereto and the article quickly removed from the mold. The molding or casting of the cover 11a presents no problem. The parts 14, 14a can be molded and resiliently sprung free of the mold. Likewise the assembling of the device is extremely simple. It suffices to drop the shutter 46 into the casing 11, apply screw 66, insert spring 54 through opening 68, apply the actuator 60 and screw 64, and then the lens 18. The range and view finders can be attached as desired. To load the camera, the rollers are dropped into guides 22 and film 25 inserted in guides 31 and along the wall 32. Now the cover 11a is snapped on, and the camera is ready for use.

In operation, after the film has been set in the usual manner and the camera properly focussed on an object, the actuator 60 is turned tensioning the spring 54, and when the latter moves past dead center it rapidly swings the shutter 46 from one end to the other end of the window 33, and the picture is taken. For the next succeeding picture the shutter is swung in the opposite direction by opposite actuation of finger piece 60. The light passes through openings 16 and 49 and through the tubular element 46 which affords a light confining passage for the light, and is finally thrown in a narrow beam along the exposed film. Since light travels in a straight line through the camera, the walls 50 cut off light rays except those which can pass through both openings 16 and 47. If the openings 16 and 49 be circular and of substantially equal diameter, the opening 16 will be fully open only while the shutter is in central alinement with axes 20 and 28; that is, the opening 16 is gradually opened to full open position and then gradually closed. In the full open position of opening 16, the slot 47 nevertheless controls the beam as above described. Nevertheless the fact that the opening 16 is full open only in one position of the shutter 46, has an advantage in increasing the sharpness of the picture. The action is somewhat analogous to a scanning action of the object by the opening 16 and its shutter portion 48. Such scanning action can be increased by constructing the opening 49 as a slot 80, as shown in Fig. 6, extending parallel to axis 20, and suitably narrow, and preferably of substantially less width than the diameter of the opening 16; and such shutter opening can even be a mere slit. Thus only those sections or segments of the opening 16 that are in alinement with the slot 47 would be in register with the shutter tube 46, and hence the possibility of stray light would be substantially wholly eliminated. The length of the opening 80 may be equal to a diameter of the opening 16. Thus it is seen that the beam directing principle of the invention may be combined with a scanning operation for the object. The shutter slot 80 may be used independently of the slot 47, or as an adjunct to the latter.

I claim:

1. A camera including means for supporting a film, means adapted for projecting light upon the film, an elongated tubular means providing a passage for the light from the projecting means to the film, said tubular means being oscillatably pivotally mounted in proximity to the light projecting means and having an opening movable into register with the light projecting means and out of register with the latter at different sides thereof upon oscillation to and fro of the tubular means, and the tubular means having a slotted opening in proximity to the film, said slotted opening extending in the direction of the pivotal axis of the tubular means.

2. A camera including a casing, means for mounting a film therein, means on the casing for causing light to be operatively projected on the film for producing a picture, a relatively flat tubular element providing a passage for the projection of light upon the film, said element being pivotally mounted in proximity to the projecting means and having an arcuate wall concentric with said pivot, said wall having an opening movable into and out of register with the light projecting means, and means to cause the opening to be cut off from the light projecting means.

3. A camera including a one piece casing open at an end thereof and having an opposite end wall for said open end, said casing having spaced tubular wall portions open at said end and adapted to receive film reels, said casing having inner wall portions extending toward each other from the tubular wall portions and being in spaced relation to the adjacent casing side wall so as to be adapted to guide a film along the spaces, said tubular portions being longitudinally slotted up to the end opening to communicate with said spaces for passage of the film between the reels, the different wall portions being integrally connected to said end wall, said casing having in a side wall thereof a light opening opposite to the area between the inner wall portions to project light on the film.

4. A camera including a one piece casing open at an end thereof, and a removable cover therefor, said casing having spaced tubular wall portions open at said end and adapted to receive film reels, said casing having inner wall portions extending in one direction and generally toward each other from the tubular wall portions and being in spaced relation to the adjacent casing side wall so as to be adapted to guide a film along the spaces, said tubular portions being longitudinally slotted up to the end opening to communicate with said spaces for passage of the film between the reels, said casing having in a side wall thereof a light opening opposite to the area between the inner wall portions to project light on the film, and a one piece flat tubular shutter open at its ends and extending between said light opening and a point in relative proximity to said inner wall portions and substantially beyond said tubular wall portions, said tubular shutter being longitudinally open along an edge thereof and being pivotally mounted in the casing in proximity to the light opening for causing light to travel along the film upon pivotal movement of the shutter.

5. A camera including a one piece casing having an end opening and an opposite end wall and a removable cover for said end opening, said casing having the side wall thereof provided with a plurality of spaced integral tubular portions longitudinally slotted toward each other internally of the casing, said tubular portions and said slots being open ended at said end of the casing to receive film reels with the film extending through the slots, the side wall having a light inlet positioned so as to direct light at the portion of the film exposed between the said slots.

6. A camera including a one piece casing having an end wall and an opposite end opening, a removable cover therefor, said casing having the side wall thereof provided with a plurality of spaced integral tubular portions longitudinally slotted toward each other internally of the casing, said tubular portions and said slots being open ended at said end of the casing to receive film reels with the film extending through the slots, the side wall having a light inlet positioned so as to direct light at the portion of the film exposed between said slots, said casing being molded and having a view finder having a casing portion molded integral with said casing.

7. A camera including a one piece casing having an end wall and an opposite end opening, a removable cover therefor, said casing having the side wall thereof provided with a plurality of spaced tubular integral portions longitudinally slotted toward each other internally of the casing, said tubular portions and said slots being open ended at said end of the casing to receive film reels with the film extending through the slots, the side wall having a light inlet positioned so as to direct light at the portion of the film exposed between said slots, and a one piece relatively flat tubular shutter element full open at an edge and adapted to be closed by said cover for the casing, means interconnecting said end wall and the closed edge portion of said element to mount said element for oscillation about a point in proximity to the light opening, said element having an arcuate end wall coaxial with said point, the wall of said tubular element being of relatively uniform thickness throughout, the casing having an arcuate seat for the arcuate end wall, the latter having an opening communicable with the light opening, and said tubular element tapering from said end wall toward its opposite end to throw a narrow beam of light upon said film.

8. The method of photographing an object including receiving light at one point from a portion of an object and projecting the light upon a film along a path elongated at an angle to the film and serving to confine the light substantially to a point at the light receiving end of the path, and causing an angular movement of said path including the point of light reception so that the entire object is photographed along the film, whereby stray light in a camera is avoided.

9. A camera including a casing having a tubular portion for receiving a film carrying roller, said tubular portion extending substantially the full length of the roller, said casing and tubular portion being open at one end, a cover for said casing and tubular portion, said cover having bearing means, and a film carrying roller in the tubular portion having an end thereof adjacent to the cover, said end having releasable bearing engagement with the bearing means, and the tubular portion holding said roller in general alinement with said bearing means for engagement therewith.

10. A camera including a casing having an end wall and an end opening opposite to said end wall, said casing having a side wall provided with a light inlet opening, said end wall being externally recessed to provide an integral inward projecting bearing portion having its axis transverse to the light opening, a shutter element in the casing oscillatably mounted on the bearing portion, and means in said recess for actuating the shutter element, whereby the shutter element can be inserted through the end opening of the casing for engagement with the bearing portion.

11. A camera including a casing having an end wall and an end opening opposite to said end wall, said casing having a side wall provided with a light inlet opening, said end wall being externally recessed to provide an integral inward projecting bearing portion having its axis transverse to the light opening, a shutter element in the casing oscillatably mounted on the bearing portion, and means in said recess for actuating the shutter element, whereby the shutter element can be inserted through the end opening of the casing for engagement with the bearing portion, said casing having film supporting means, the shutter element being of tubular form and extending between the light opening and the supporting means, said shutter element having a longitudinal opening at the casing and opening, means accessible through the said opening in the shutter for securing the same to the bearing portion, and a removable cover for the said openings of the casing and shutter.

12. A camera having a casing, means for supporting a film therein, and means for projecting light on the film, including a generally flat tubular element, said element having near one end thereof a recess at an edge of the element, means in said recess interconnecting said casing and said element to mount the latter for oscillation to thus project light on the film, said means including a hub on the casing extending into the recess so as to journal the element on the hub.

JAMES P. BURKE.